United States Patent [19]
Winner et al.

[11] Patent Number: 5,400,864
[45] Date of Patent: Mar. 28, 1995

[54] METHOD AND APPARATUS FOR CONTROLLING THE SPEED OF A VEHICLE AND ITS SPACING FROM A PRECEDING VEHICLE

[75] Inventors: Hermann Winner; Stefan Witte, both of Karlsruhe, Germany

[73] Assignee: Robert Bosch GmbH, Stuttgart, Germany

[21] Appl. No.: 986,430

[22] Filed: Dec. 4, 1992

[30] Foreign Application Priority Data

Jan. 14, 1992 [DE] Germany ............. 42 00 694.5

[51] Int. Cl.⁶ .......................................... B60K 31/04
[52] U.S. Cl. .................................. 180/169; 180/170; 180/179; 318/587; 364/426.04; 340/903
[58] Field of Search ............... 180/169, 170, 174, 179; 318/587; 340/436, 903; 364/426.04

[56] References Cited

U.S. PATENT DOCUMENTS

| | | |
|---|---|---|
| 3,705,639 | 12/1972 | Colling et al. |
| 3,869,019 | 3/1975 | Cardani . |
| 4,622,636 | 11/1986 | Tachibana . |
| 4,921,063 | 5/1990 | Masuda ............... 180/178 |
| 4,922,428 | 5/1990 | Takahashi .......... 180/178 X |
| 4,934,477 | 6/1990 | Dai .................... 340/436 X |
| 4,975,850 | 12/1990 | Diller .................. 340/436 X |
| 4,979,113 | 12/1990 | Roberts et al. ..... 318/587 X |
| 5,119,006 | 6/1992 | Torii et al. ......... 318/587 X |
| 5,197,562 | 3/1993 | Kakinami et al. .. 180/170 X |
| 5,234,771 | 8/1993 | Kajiwara ............ 180/170 X |

FOREIGN PATENT DOCUMENTS

| | | | |
|---|---|---|---|
| 0348691 | 1/1990 | European Pat. Off. ........ 340/436 |
| 3420004 | 12/1985 | Germany . | |
| 0198172 | 12/1982 | Japan ................. 180/167 |
| 0030427 | 2/1986 | Japan ................. 180/170 |
| 0049532 | 3/1988 | Japan ................. 180/178 |
| 0114541 | 5/1989 | Japan ................. 180/170 |

*Primary Examiner*—Brian L. Johnson
*Attorney, Agent, or Firm*—Frishauf, Holtz, Goodman & Woodward

[57] ABSTRACT

An automatic speed and distance control apparatus responsive to detected signals and operator induced signals for automatically controlling the speed of an automotive vehicle and its distance with respect to objects in its path of movement. A flexible control scheme is provided, which permits a driver to intervene in the operation of the system when he or she wishes to accelerate in preparation for a passing maneuver. Upon interruption of the operation by a vehicle driver, the control apparatus is interrupted for a predetermined period of time and thereafter resuming automatic control function.

13 Claims, 5 Drawing Sheets and moving at velocity v. A desired acceleration value $a_{s1}$, hereafter "desired control value", may be calculated on the basis of the values d, $v_v$ and v. The calculation is based on the following equation:

METHOD AND APPARATUS FOR CONTROLLING THE SPEED OF A VEHICLE AND ITS SPACING FROM A PRECEDING VEHICLE

FIELD OF THE INVENTION

The invention, in general, relates to a method of controlling the speed of a vehicle and its distance from objects placed in the direction of its movement, and, more particularly, to such a method in which the actual distance, as well as the instantaneous speed are measured to derive, and set on the basis thereof, desired speed and distance values. The invention also relates to an apparatus for practicing the method.

BACKGROUND OF THE INVENTION

Methods and apparatus for controlling the speed of a vehicle and its distance to objects present in the path of its movement are known. Not only may the speed of a vehicle be controlled automatically by means thereof, but also a safety distance may be set between the vehicle and another vehicle ahead of it, especially for travelling in a convoy. It has been found, however, that the known methods and apparatus are not sufficiently adaptable to respond appropriately to all travel conditions. For instance, a driver may want to accelerate his vehicle while still in its current driving lane when preparing for passing another vehicle, even if this results in reducing the safety distance between his own and the vehicle to be passed. Such action is not possible with known systems.

THE INVENTION

By contrast, the method and apparatus of the present invention are advantageous, in that the control scheme is flexible, and responds in a safe manner to different traffic conditions.

By interrupting the distance control of the present speed and distance control whenever the operator intervenes in the driving operation, a flexible or appropriate response of the system to different driving conditions is assured. In order to satisfy high safety demands at the same time, the interruption of the distance control will preferably be limited to a predetermined interval of time; that is to say, the distance control will automatically resume operation upon expiration of a predetermined time.

In another advantageous embodiment of the invention, the change in time of the acceleration and/or the reduction in the speed of the vehicle may be limited.

In still another advantageous embodiment, the change in acceleration may be restricted during passage of the vehicle through a curve, changing lanes and/or in restricted control conditions.

Yet another advantageous embodiment provides for restricting the change in speed reduction during restricted control conditions.

DETAILED DESCRIPTION OF THE PREFERRED EMBODIMENT

As stated above, it is known, in principle, to employ speed and distance controls in automotive vehicles, in which a speed or velocity $v_{set}$ desired by an operator is preset. By means of a known distance sensor, which may, for instance, be a radar apparatus, the distance d to an object present in the path of movement may be determined, or to a vehicle moving at a speed $v_v$ in the same direction as the vehicle equipped with the control and moving at velocity v. A desired acceleration value $a_{s1}$, hereafter "desired control value", may be calculated on the basis of the values d, $v_v$ and v. The calculation is based on the following equation:

$$a_{s1} = c_1 (v_v - v) + c_2 (d - d_{soll}). \quad (1)$$

In this equation, $d_{soll}$ defines a desired distance to objects present in the direction of movement, and may either be preset, or be determined as a speed dependent value.

Independently of the desired acceleration value $a_{s1}$, a desired acceleration $a_{set}$, hereafter "driver desired value", will be determined on the basis of the desired speed $v_{set}$ set by the operator. The calculation is based on the following equation:

$$a_{set} = c_3 (v_{set} - v1). \quad (2)$$

Figure 1:
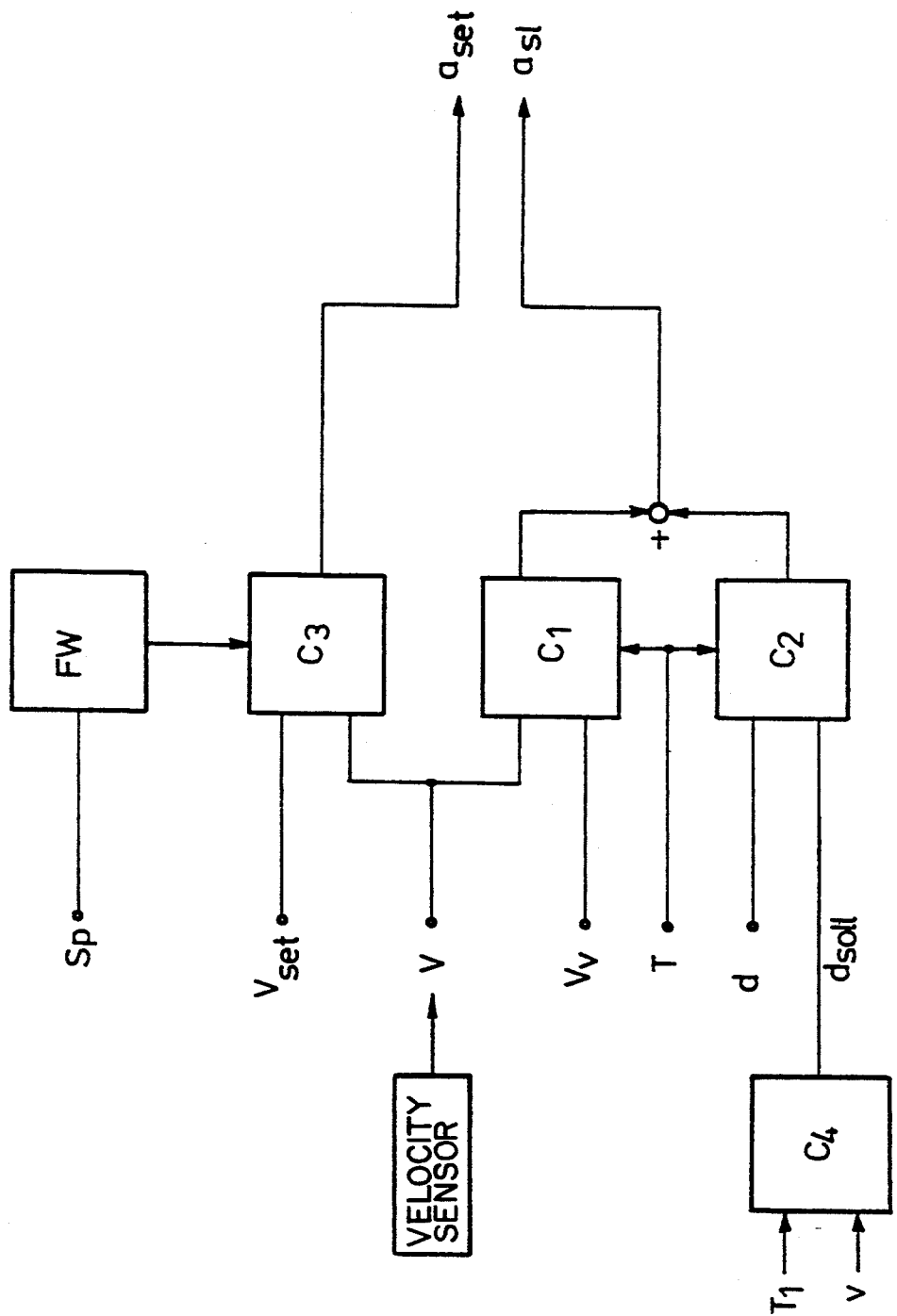
FIG. 1 is a function diagram explaining how a driver-target value $a_{set}$ and a system-target value $a_{s1}$ for the acceleration are derived.

The implementation of equations (1) and (2) is explained by the function diagram of FIG. 1. It shows that the actual speed v of the vehicle is processed with the speed $v_v$ of the preceeding vehicle and, in accordance with equation (1), with a constant value $c_1$.

At the same time, the desired distance $d_{soll}$ to the preceding vehicle is processed with the actual distance or spacing d between the two vehicles and, in accordance with equation (1), with a constant value $c_2$. The result of the two calculations is combined in a summing stage and results in the desired control value $a_{s1}$. FIG. 1 indicates that a time constant T which is dependent upon the speed, influences the calculation constants $c_1$ and $c_2$.

In accordance with FIG. 1, a time constant $T_1$ and a constant $c_4$ are also used in calculating the desired distance $d_{soll}$. $T_1$ may, for example, be determined on the basis of visibility conditions. These conditions are detected by the control system, e.g. by testing or polling the state of the windshield wipers. This is based upon the assumption that actuation of the wipers, when it is raining for instance, indicates that visibility and road surface conditions have deteriorated.

The actual speed v of the vehicle equipped with the control system is also combined with with the speed $v_{set}$ set by the driver, with a constant $c_3$ being factored into the calculation, as shown in equation (2), resulting in the driver-desired or target value $a_{set}$.

FIG. 1 also indicates that a quantity FW, which represents the driver's wishes, is taken into consideration calculating the driver desired value $a_{set}$. Value FW, to be considered in more detail below, is a function of, for instance, a lane change, as indicated at Sp in FIG. 1.

Figure 2:
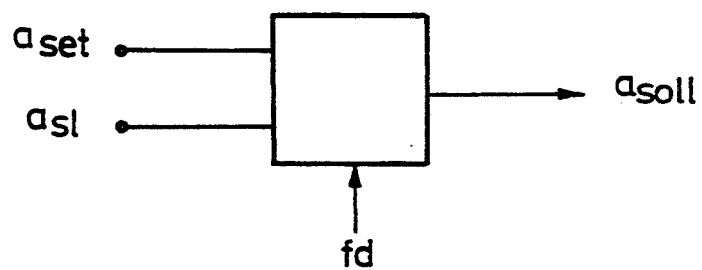
FIG. 2 is a general diagram explaining the further processing of desired or target acceleration values.

The system target value $a_{s1}$ and the driver target value $a_{set}$ do not directly enter into the control of the speed of the vehicle and its distance to a preceding vehicle. Rather, the two desired values are combined, as depicted schematically in FIG. 2. This combining results in a desired value $a_{soll}$ which ultimately is processed during straight movement control of the vehicle, i.e. this is the target value which is relevant in the regulation of speed, and of distance or vehicle spacing. The combining factor used is a value fd representing driver dominance, which will be explained below.

Figure 3:
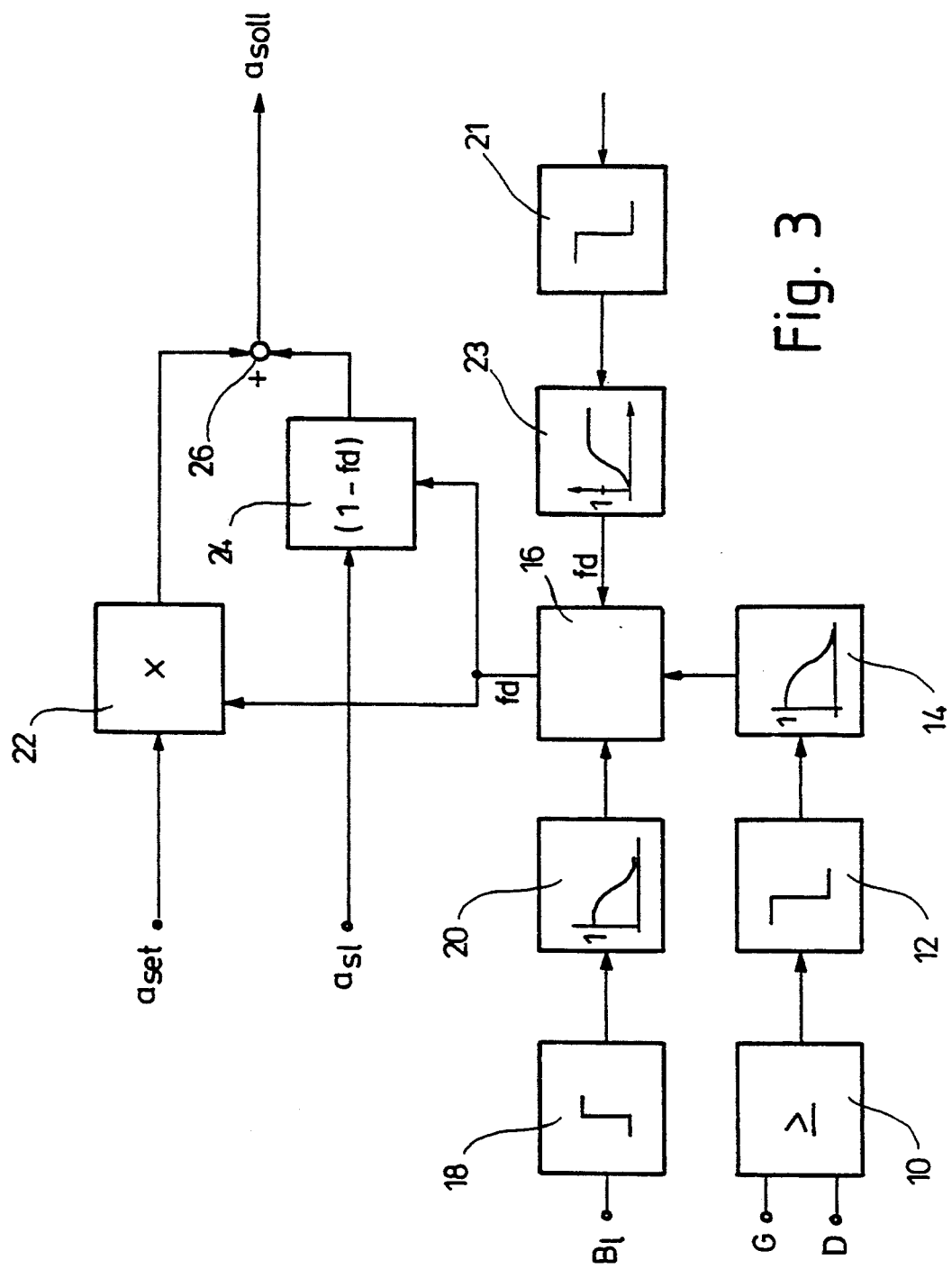
FIG. 3 is a function diagram explaining different interventions by an operator in the control system.

If no vehicle is present within the measuring range of the distance sensor, the driver target value $a_{set}$ is utilized in the drive and brake controls, since in that case the value fd goes to 1, and the output of element 26 is 0 (see FIG. 3).

If the driver intervenes in the driving process, the distance control to objects in the path of movement will be interrupted. Interruption of the distance control ensures that upon intervention by the driver in the driving process, the actual distance to an object in the path of movement, more particularly to a preceding vehicle, is ignored by the control device. In this manner, the safety distance to the preceding vehicle may be reduced. Interruption of the control will, however, be maintained for a predeterminable time only. Thereafter, the speed of the vehicle, as well as its distance to objects in its path of movement, will be controlled again.

Actuation of the directional signals or the accelerator are examples of driver interventions. In such cases, the distance control is interrupted. If, however, the driver were to actuate the brake, the speed and distance control are switched off completely until they are reactivated by the driver. To this extent, the behavior of the apparatus described here generally corresponds to known systems of this kind.

Two variations of intervention have been depicted in FIG. 3, i.e. actuation of the directional signal by turning on the left blinker, and actuation of the accelerator. When the driver actuates the accelerator, it will affect the distance control to the extent a small minimum value is exceeded. FIG. 3 depicts an evaluation device 10 which determines these relationships. At the output of the evaluation device, there is provided a first switching element 12 designated with a falling or negative-going edge, which is to indicate that, upon a corresponding output signal from the evaluation device 10, the control system will respond to the negative-going edge signal from the evaluation device 10. As soon as the accelerator is depressed, the evaluation device 10 will respond, and interrupt the distance control by setting value fd to 1 and adjusting the system to the driver target value $a_{set}$.

As soon as the driver releases the accelerator, there will appear, at the output of the evaluation device 10, a signal with a negative-going edge, which will be detected by first switching element 12. The switching element 12 is connected to a first timing member 14.

In the embodiment of the control apparatus presented here, the distance control is automatically reactivated after an interval of time, which may be preset. Thus, it is not necessary, after intervention by the driver in the driving process by actuation of the accelerator, that the driver manually reactivate the control system. This time response is indicated by the first timing member 14 shown in the diagram: at a first true output signal of the first switching element 12, initially a normalized value "1" will be assumed, which in the course of time declines to "0".

The output signal of the first timing member 14 is fed to a maximum value evaluation device 16, at the output of which signal fd is present.

FIG. 3 furthermore depicts, by way of example, the response of the control to actuation of the left direction signal (the right signal in left hand traffic systems). A second switching element 18 will respond to the positive-going edge which is generated when the directional signal is actuated. This has been indicated in FIG. 3 by a corresponding symbol. As soon as the second switching element 18 is actuated, the distance control is deactivated, in a manner similar to that upon actuation of the accelerator. However, the distance control is reactivated after a predeterminable time by a second timing member 20 connected to the output of the second switching element 18. Therefore, in this case, too, it is unnecessary for the driver to manually reactivate the control system after actuation of the directional control. Here, too, the function of second timing member 20 is indicated by a schematic diagram, in which, upon the occurrence of an output signal from the second switching element 18, a normalized value "1" is initially assumed, which thereafter declines to "0" after a predeterminable interval of time.

Again, the output signal of the second timing member 20 is fed to the maximum value evaluation device 16. In case further interventions by the driver in the driving process are to be considered, further input signals may be fed to device 16. For example, one could provide an extra button for the driver to press, if he or she wishes to interrupt the distance control scheme, at least for a presettable period of time.

As shown in FIG. 3, the output signal fd of the maximum value evaluation device is combined with the driver target value $a_{set}$ and the system target value $a_{s1}$. That is to say that FIG. 3 depicts a variation of the combining step of FIG. 2.

In the embodiment depicted here, the combining is accomplished by the following equation:

$$a_{soll} = fd \cdot a_{set} + (1-fd) \cdot a_{s1}. \tag{3}$$

The implementation of this equation is explained in FIG. 3: in a first calculation stage 22, the driver desired value $a_{set}$ is multiplied by the output value fd of the maximum value evaluation device 16. Then, in a second calculation stage 24, initially the value $(1-fd)$ is calculated, then multiplied by the control system target value $a_{s1}$. The output signals of the calculation stages 22 and 24 are fed to a summing channel 26, and in this manner the result of the calculation in accordance with equation (3) is obtained. For that reason, the output signal of the summing channel 26 has been marked $a_{soll}$.

As may be seen from the explanation of FIG. 3, actuation of the left direction signal $B_l$, results in an interruption of the distance control. This intervention by the driver is interpreted to be an initiation of a passing maneuver. To distinguish from a normal lane change, the instantaneous actual speed v of the vehicle is read upon actuation of the left directional signal. Upward of a certain speed, which may be about 70 km/h, it is concluded that a passing maneuver is to be executed, instead of simply a lane change. At the beginning of the direction signals, the output signal of the second switching element 18 is utilized to generate an output value "1" in the second timing member 20. This declines monotonically in time, measured from the beginning of the blinking lights, until a "0" value is reached. The course or reduction of the value may proceed along a characteristic curve as indicated in FIG. 3. For example, the characteristic curve may be presumed to be linear, so that, commencing with a value "1", value "0" will be arrived at within two seconds That is to say, after two seconds the distance control will be reactivated.

Therefore, if the driver actuates the left direction signal, and if this is done at so high a speed that the system assumes initiation of a passing maneuver, the distance control will be suppressed for two seconds. Thus, if the driver changes lanes and moves immediately behind a vehicle, the new distance to the preceding vehicle will initially be ignored by the speed and distance control. With this kind of distance control suppression, a smooth reactivation of the distance control may be achieved, where this is made necessary by vehicles moving in the passing lane or where it is necessary after an aborted passing maneuver. Also, in this manner, acceleration is possible in the actual driving lane before a change takes place into the passing lane, where traffic as a rule moves at a higher speed.

Advantageously, the control is arranged in such a way that, upon actuation of the left direction signal, while the distance control is interrupted, the speed is increased, for instance up to the value $v_{set}$, in accordance with a presettable profile or characteristic curve.

In this manner, a passing maneuver may be executed automatically: the driver, by actuating the left direction signal, indicates to the distance control his intention to execute a passing maneuver, it being understood that actuation of the left direction signal depending upon the speed of the vehicle may also be interpreted as an intention to pass. Thereupon, the distance control is interrupted for a presettable interval of time, and the vehicle is accelerated to the maximum speed $v_{set}$ as preset by the driver. Thereafter, the distance control is reactivated. That is to say, the distance d to preceding vehicles is measured and upon reaching a safety distance $d_{soll}$, the instantaneous speed of the vehicle is reduced until the vehicle equipped with the control system follows the preceding vehicle at the speed $v_v$ of the latter.

In accordance with FIG. 3, the driver may also interrupt the distance control by actuating the accelerator pedal; that is to say, the distance to a preceding vehicle may be reduced below the desired distance $d_{soll}$.

In this sense, the driver can intervene in the driving process by reducing the distance to a preceding vehicle before he actuates the left directional signal for the purpose of initiating a passing maneuver or of reducing the safety distance for some other reason.

In accordance with FIG. 3, the maximum evaluation device 16 evaluates the instantaneous condition: The intervention by the driver which is most noticeable in the value fd will be taken into consideration for purposes of further activating the control apparatus. If then, the output signal in the first timing member 14 has largely diminished because some time ago the driver had already released the accelerator pedal, at a subsequent actuation of the left directional signal the output signal of the second timing member 20 will affect the control system if its output signal is larger than that of the first timing member 14.

In the explanation of FIG. 3 up to this point, the presence of a constant presettable time value has been assumed in describing the first timing member 14 and the second timing member 20. However, it is also possible that the preset slope of the curve in these timing members varies as a function of speed, that is to say, the interruption of the distance control is set in dependence of the instantaneous speed of the vehicle. This may be accomplished, for instance, by storing a plurality of speed-related time values in the timing members 14 and 20 or by preprogramming speed-dependent characteristic fields.

Overall, it can be seen that the driver's intervention in the control arrangement is effective for a certain time only. After expiration of the intervals of time preset in the timing members, the distance control is reactivated so that in the end no further effect of the driver's action can be detected. In this connection, it is assumed that, immediately after actuation of the switching elements 12 and 18, the so-called driver's dominance takes the value of "1" which thereafter is diminished to "0" upon expiration of the interval of time preset in the timing members. Hence, the driver dominates the system by his intervention in the driving process at least for a presettable time. The system responds to this intervention by a temporary deactivation of the distance control. Therefore, one may assume that the driver desired value $a_{set}$ is decisive exclusively in respect of the action of the control system when driver dominance has assumed the value "1". The control system target value $a_{s1}$ correspondingly dominates the system when the driver dominance has assumed a "0" value. The driver dominance labeled fd has been indicated in FIG. 4 by an evaluation element 28. The action of this evaluation element may be understood on the basis of the explanation of FIG. 3. Hence, it is assumed that the relationship $0 \geq fd \geq 1$ is realized within the evaluation element 28. Finally, the output value $a_{soll}$ is preset at the evaluation element 28.

In this connection, it is assumed that the driver dominance remains unchanged when the right directional signal is actuated by the driver, or when the left turn signal is actuated below the minimum vehicle speed. In such cases, it is assumed that a lane change only is intended, and that, while the distance control is to be interrupted, no acceleration by the control system is desired. This effect is expressed in this example by the value FW representing the driver's will. The kind of influence may be realized analogously to the influence of the driver's will FW, with the time-wise behavior being, of course, differently realizable. The input values are the left and right directional signals.

In this operation, the value of the driver's will FW is varied in the normalized range of 0 . . . 1. A "0" value indicates that the system may not change its positive state of acceleration. A value of "1" is indicative of the fact that the control may accelerate the vehicle to a speed $v_{set}$, also named "set speed", preset by the driver, provided the desired speed and the driver dominance permit such acceleration.

Since driver dominance fd remains unchanged during a lane change, the output signal at the output of the evaluation element 28 does not change. It is possible that a so-called restricted control condition will arise. This is always the case when the system cannot detect an object within its measuring range. In that case the driver dominance changes, for instance, linearly as a function of time to a value of "1", within two seconds. As a result, the system target value $a_{s1}$ will be abandoned and the driver target value $a_{set}$ will be adopted for the further control process. If, for instance, the control system has restricted the instantaneous maximum speed of the vehicle to 140 km/h, because a slower-moving vehicle is ahead of it in its path of movement, the vehicle cannot attain the speed actually intended by the driver, for instance, 160 km/h. If the preceding vehicle turns a corner, so that the system can no longer detect any object within its measuring range, the driver dominance increases to a value of "1", and the value preset by the control will be abandoned, and the vehicle is accelerated to the speed $v_{set}=160$ km/h preset by the driver. This circumstance is shown in FIG. 3 where the lack of a distance signal actuates a switching member 21 the output signal of which is fed to a timing member 23. The output signal of this timing member is labeled driver dominance fd and is fed to the maximum value evaluation device 16.

In this process, it must be recognized that the desired control value is a compound of measured values and that a so-called quality value is taken into consideration in its calculation. This value is combined with the measured values. For instance, improbable distance signals may occur when the preceding vehicle moves through a curve and instead of detecting the preceding vehicle, the distance measuring system picks up an error signal, such as from a tree by the side of the road. This results in an abrupt change in the distance signal from the forwardly positioned object. As long as the preceding vehicle was detected, the distance remained constant; but now the distance to the forwardly positioned object is rapidly reduced. This rapidly changed distance signal thus is implausible. The distance signal detected in such circumstances is initially ignored in order to avoid unnecessary abrupt changes in the speed of the vehicle.

It is also possible that different distances are detected in rapid succession when the distance measuring apparatus measures the bumper, thereafter the rear wall of the vehicle, and then, perchance, its rear window. Such rapidly changing distances resulting in implausible signals are also ignored by the distance and speed control. Such improbable or implausible measuring values of the kind described above enter into the above-mentioned quality value. The timewise change in acceleration (upwardly and downwardly) is limited in dependence upon this quality signal.

These interrelationships will be explained in more detail with reference to FIG. 4:

The output signal of the evaluation element 28 is evaluated by an evaluation device 30, whereby on the one hand an upward acceleration —30a— and, on the other hand a deceleration —30b— are limited. In the upper portion of the evaluation device 30, detection of three different limiting criteria takes place. A first limiting device 32 detects, as explained supra, the admissible timewise change in the output signal of the evaluation element 28 in dependence of the quality signal. When detecting a restricted control condition, small changes in acceleration will be permitted at the most. Where a preceding vehicle is "lost" no change whatever in the brake/acceleration condition of the control device will be allowed. The driver may, of course, independently thereof brake or accelerate the vehicle.

A second limiting device 34 limits the timewise change in the desired value $a_{soll}$ as a function of bends in the road, as detected from the steering condition and/or by the lateral acceleration of the vehicle. Where the steering wheel of the vehicle is moved, very rapid changes in the desired acceleration of the vehicle may be detected because, instead of the forwardly positioned vehicle, other objects at the side of the road or vehicles in adjacent lanes are detected. Such rapid timewise changes of the desired acceleration value are limited by the second limiting device 34.

A positive change in acceleration is limited, if not totally prevented, by a third limiting device 36 in dependence of the value of the driver's will FW, which is appropriately set when changing lanes. Of course, braking by the system remains possible, and the driver may at any time brake the vehicle.

On the basis of what has been stated above, a change of lanes may be detected by actuating the right directional signal or by actuating the left directional signal at a vehicle speed below the limiting speed.

The output signals of the three limiting devices 32, 34, 36 are fed to a minimum value evaluator 38 the output signals of which are in turn subject to a maximum value evaluator 40. Aside from the output signal already mentioned, this maximum value evaluator also takes into account the driver dominance fd generated by a calculation stage 42 and multiplied by a constant $c_a$.

Figure 4:
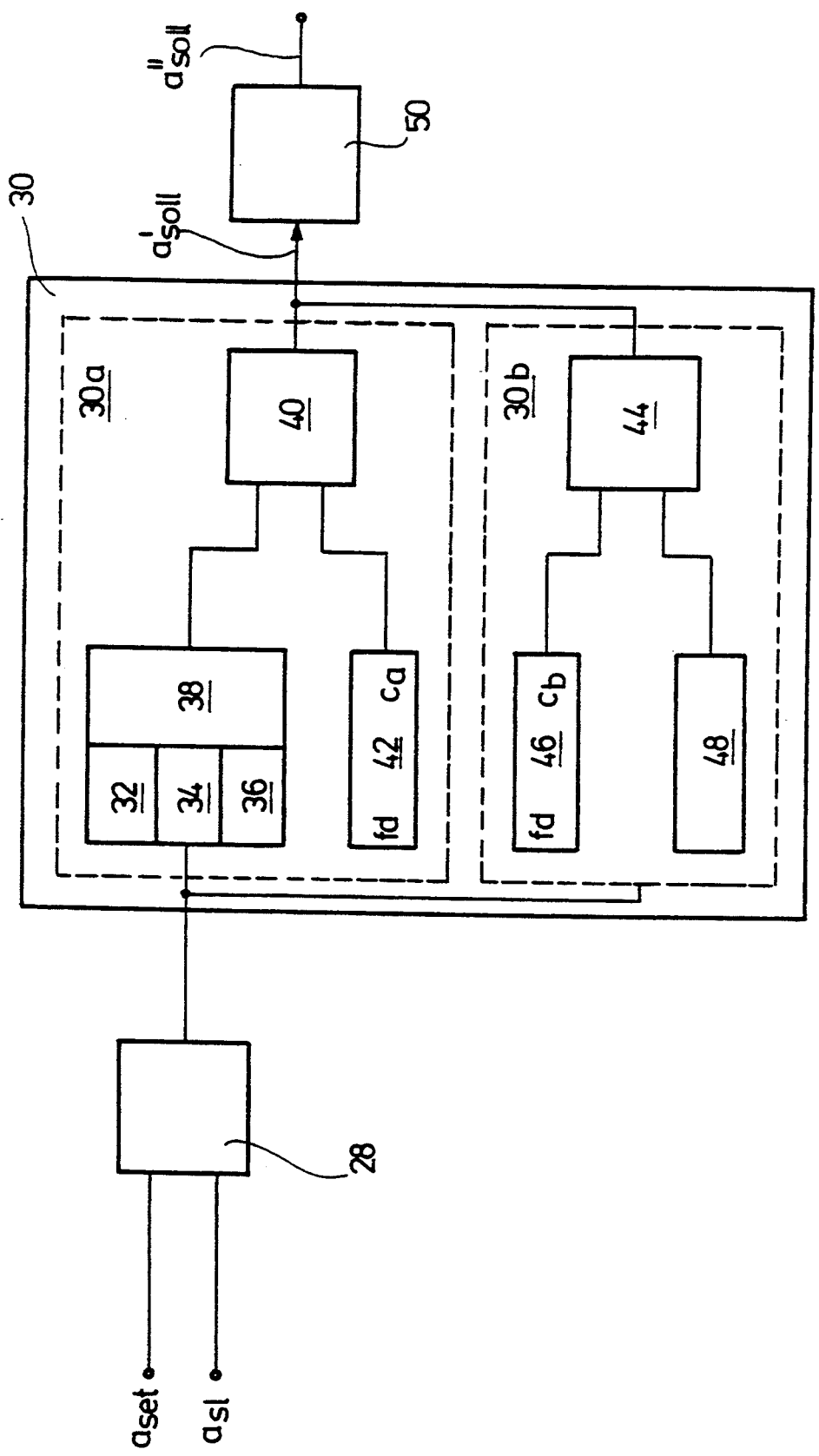
FIG. 4 is a diagram depicting the processing of a desired acceleration value.

Negative acceleration or deceleration is limited by a further maximum value evaluation device 44 (see the circuit arrangement 30b in FIG. 4). For this purpose, on the one hand the driver dominance fd is multiplied by a constant $c_b$ in a further calculation stage 46 and on the other hand the quality signal for the control condition rq is utilized in an appropriate manner in an evaluation device 48.

At the output of the evaluation device 30 an evaluated signal $a'_{soll}$ is present, the timewise changes of which are limited in an upward as well as in a downward direction. In this manner, smooth driving of the vehicle is ensured, and abrupt changes in acceleration and deceleration are prevented.

The output signal $a'_{soll}$ is also fed to an absolute value limiting device 50, which limits the absolute values of the desired value. In this manner, excessively strong accelerations as well as decelerations by the system are avoided. That is to say, rapid starts are prevented, as are sudden brakings.

The signal $a''_{soll}$ at the output of the absolute value limiting device 50 is utilized as a desired value for the longitudinal control, i.e. for the control of speed and distance of the vehicle.

Further limiting possibilities may additionally be provided. For instance, too high an acceleration of the vehicle may be prevented at falling temperatures, i.e, at the threat of icy roads, or at excessively wet conditions, i.e. when aquaplaning or hydroplaning is possible.

It is to be made clear again that the driver may, of course, turn off the control device at any time by actuation of the brake. In such a case, the control device can be reactivated only by actuating an appropriate switch. Moreover, the driver may at any time accelerate the vehicle by actuating the accelerator pedal, even if this results in reducing an otherwise preset minimum distance $d_{soll}$. In addition, he can at any time exceed the speed limit $v_{set}$ set by him. For that purpose, the drive must push down the accelerator pedal to an extent that the angular position of the throttle valve desired by him exceeds the value set by the control device. Hence, the driver remains in control in all circumstances, so that sacrifices in safety need not be expected.

In addition, provision may be made that while the distance control may be interrupted as described in connection with FIG. 3, at an intentional acceleration of the vehicle by the driver, a reduction of the safety distance may be indicated by a visual or audible alarm, so that if he so desires the driver may abandon the process of acceleration. In addition, emergency interventions by the system may be provided for, such as, for instance, that further acceleration when the spacing is less than the safety distance is possible only upon switching off the control system.

In toto, the driving operation is as follows:

The driver may set a defined speed $v_{set}$ at which the vehicle is to move. For turnpike driving a desired $v_{set}$ of 160 km/h, for instance, may be set. If the control system detects a vehicle at a distance less than the distance $d_{soll}$ to be achieved by the system, the speed v of the vehicle will be reduced to the point where it matches the speed $v_v$ of the preceding vehicle and where an appropriate safety distance has been attained.

If the driver actuates the right directional signal with a view to indicating a lane change, the distance control will be interrupted in a way that an acceleration executed by the preceding vehicle is not followed. If, however, the preceding vehicle reduces its speed, the speed of the controlled vehicle will also be reduced.

If, however, the driver actuates the left directional signal in order to initiate a passing maneuver the instantaneous desired control value derived from the instantaneous distance to the preceding vehicle will no longer be adhered to, and the system will accelerate the vehicle, commencing from speed v and proceeding to the set speed $v_{set}$. Even if during a passing maneuver the distance control is initially interrupted, it will be resumed automatically without further action by the driver after a predetermined time, which may be chosen as a function of speed, so that speed and distance relative to the preceding vehicle may again be controlled.

The driver may also override the automatic control by depressing the accelerator pedal. The system will acknowledge the driver's intervention by switching off the distance control and let the vehicle be accelerated as desired. As soon as the driver releases the accelerator pedal, the presettable distance control, which again may be set as a function of a speed-related time constant, will automatically be resumed.

Figure 5:
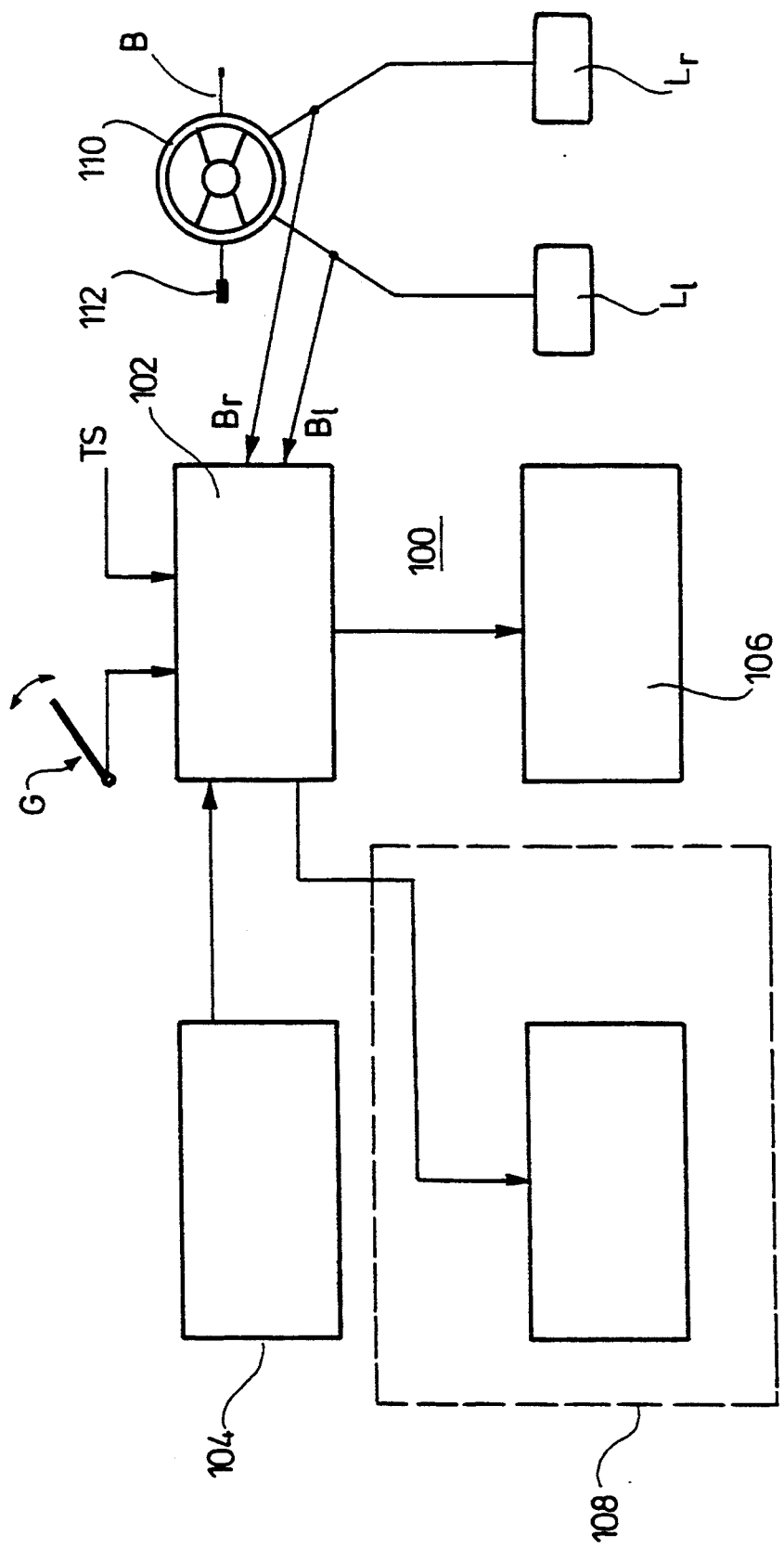
FIG. 5 is a schematic block diagram of a control apparatus.

FIG. 5 depicts the control device 100 described above. The device 100 comprises a distance and speed control 102, a distance sensor 104, an acceleration control 106 as well as an optional braking device 108. Details of the distance and speed control device 102 have been explained with reference to FIGS. 1–4. Also indicated are a tachometer signal TS as well as signals from the right and left blinker controls; these signals have been labeled $B_r$ and $B_l$. The right and left blinker directional lights have been labeled $L_r$ and $L_l$, and the directional control switch (blinker lever) positioned adjacent the steering wheel 110 has been labeled B. Adjacent the steering wheel there is also provided a lever 112 for actuating the control device 100, which lever may, for instance, trigger the following functions:

Upward movement of the lever 112: accelerating the vehicle;

downward movement of the lever: decelerating the vehicle;

pushing the lever in direction of vehicle movement, i.e. normal to the image plane: deactivation of the control device 100;

pulling the lever opposite the direction of vehicle movement: activation of the control device 100, by considering the last-input speed values where applicable.

Furthermore, an accelerator pedal G has been shown, the instantaneous position of which will be detected by the speed and distance control 102.

As may be seen from FIG. 5, the instantaneous speed of the vehicle is detected on the basis of the signal TS from the speedometer, and the distances to objects in the path of movement are detected by the distance sensor 104. It is also apparent that, for purposes of acceleration, the distance and control device 102 acts upon the accelerator pedal or on an engine control device which reacts to signals from the accelerator pedal. If necessary, a signal from the speed and distance control 102 may be fed to the braking device 108 to effect a desired deceleration or retardation to slow down the vehicle.

What is claimed is:

1. A method of controlling the speed of a land vehicle and distance of said land vehicle from a preceding vehicle, comprising the steps of:
    measuring the actual distance between said land vehicle and said preceding vehicle;
    measuring the instantaneous vehicle speed of said land vehicle with respect to a road surface;
    deriving, from measurements of said actual distance and said instantaneous speed, target values of a desired distance and speed;
    automatically controlling vehicle speed and acceleration or deceleration toward said desired distance and speed target values; and
    upon a sensing a vehicle operator intervention,
    interrupting said controlling step, for a predetermined period of time, and after elapse of said predetermined period of time, automatically resuming said controlling step.

2. The method of claim 1, wherein said step of operator intervention comprises changing the speed of said vehicle.

3. The method of claim 2, wherein said speed changing step comprises accelerating said vehicle.

4. The method of claim 2, wherein said speed changing step comprises reducing the speed of said vehicle.

5. The method of claim 3, including the step of
    determining if said vehicle is traversing a curved segment of a road; and
    further including the step of
    limiting acceleration during said accelerating step if traversing a curved road segment is sensed.

6. The method of claim 3, wherein the acceleration of said speed changing step is limited during a lane change.

7. The method of claim 1, including the step of determining if evaluation of measured values of speed and distance indicates that said measured values are plausible or implausible; and
    limiting the acceleration whenever said determination step determines that said measured values are implausible.

8. The method of claim 1, wherein said speed and distance control is responsive to actuation of the accelerator of said vehicle.

9. The method of claim 1, including the step of controlling said predetermined period of time as a function of the measured instantaneous speed of said land vehicle.

10. A method of controlling the speed of a land vehicle and a distance between said land vehicle and a preceding vehicle, comprising the steps of:
    measuring an actual distance between said land vehicle and said preceding vehicle;

measuring the instantaneous speed of said land vehicle with respect to a road surface;

deriving, from measurements of said actual distance and said instantaneous speed, target values of a desired distance and speed;

automatically controlling vehicle speed and acceleration/deceleration toward said desired distance and speed target values;

interrupting said controlling step, for a predetermined period of time, each time that a vehicle operator manually intervenes, by actuation of a directional signal, and thereafter resuming said controlling step.

11. A method of controlling the speed of a land vehicle and a distance between said land vehicle and a preceding vehicle, comprising the steps of:

measuring an actual distance between said land vehicle and said preceding vehicle;

measuring the instantaneous speed of said land vehicle with respect to a road surface;

deriving, from measurements of said actual distance and said instantaneous speed, target values of a desired distance and speed;

automatically controlling vehicle speed and acceleration/deceleration toward said desired distance and speed target values;

interrupting said controlling step, for a respective, different predetermined period of time, each time that a vehicle operator manually intervenes by performing one of the following operations:
changing lanes to the right,
changing lanes to the left, and
a passing operation.

12. A method of controlling the speed of a land vehicle and a distance between said land vehicle and a preceding vehicle, comprising the steps of:

measuring an actual distance between said land vehicle and said preceding vehicle;

measuring the instantaneous speed of said land vehicle with respect to a road surface;

deriving, from measurements of said actual distance and said instantaneous speed, target values of a desired distance and speed;

automatically controlling vehicle speed and acceleration/deceleration toward said desired distance and speed target values;

interrupting said controlling step, for a predetermined period of time, each time that a vehicle operator manually intervenes to perform a passing operation, and then accelerating the vehicle, along a predetermined speed vs. time curve, to a speed preset by the operator.

13. A system for controlling, in a land vehicle, speed and distance, or spacing from an object ahead in said vehicle's direction of travel, comprising means (104) for measuring said spacing from said object;

means (TS) for measuring said vehicle speed;

a control apparatus (102), coupled to outputs of said detecting and measuring means, for automatically controlling vehicle speed and acceleration in order to reach and maintain an optimum spacing; and means (B, $B_r$, $B_l$) for detecting operator actuation by a vehicle operator of vehicle controls, said control apparatus, upon detection of operator actuation, interrupting said automatic control for a limited, predetermined period of time in response to actuation of predetermined ones (106, 108) of said vehicle controls and after elapse of said time period, resuming said automatic control.

* * * * *